Nov. 4, 1930. E. M. KRATZ Re. 17,854
TRANSPARENT PAPER MACHINE
Original Filed Aug. 13, 1925 4 Sheets-Sheet 1
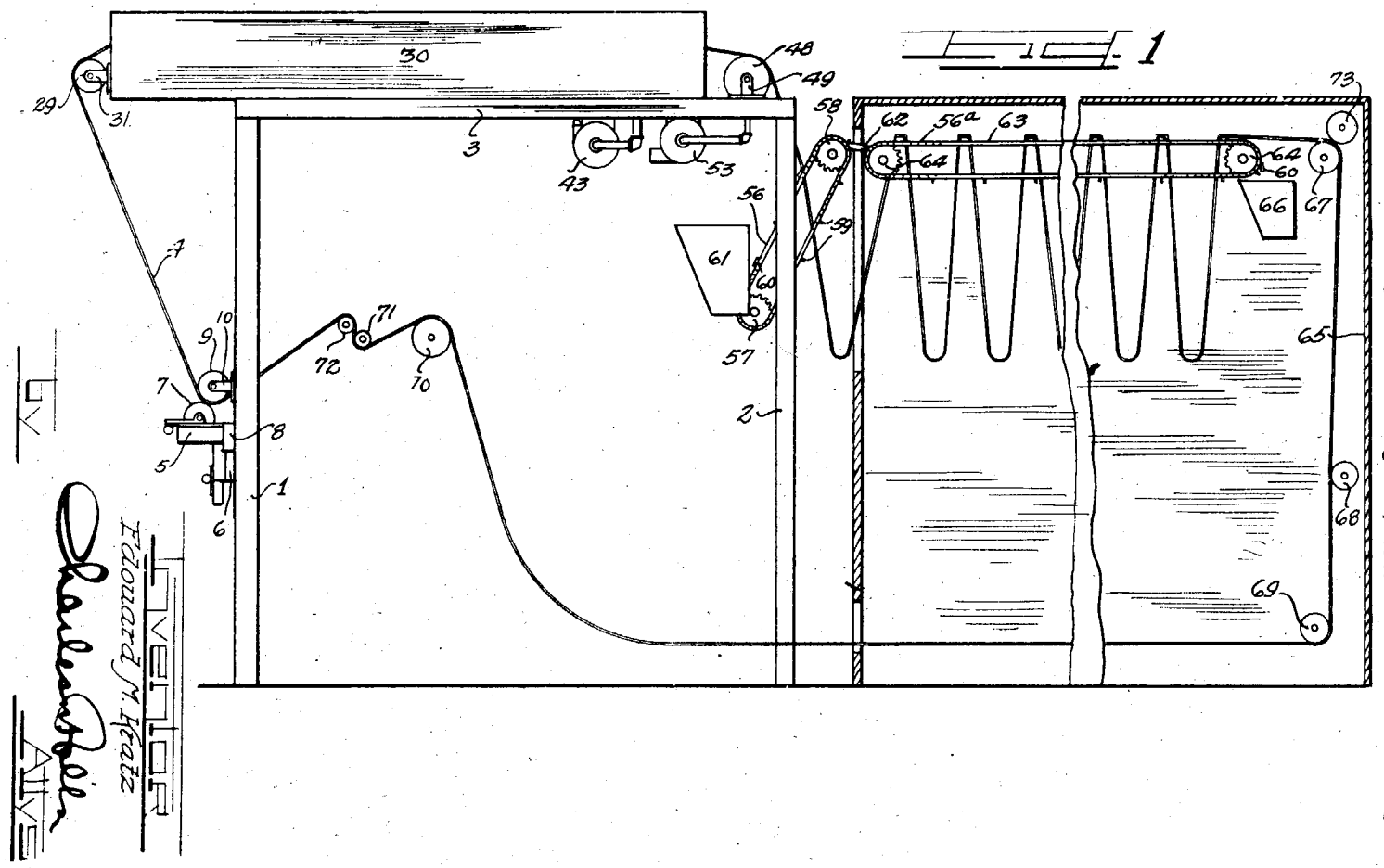

Nov. 4, 1930. E. M. KRATZ Re. 17,854

TRANSPARENT PAPER MACHINE

Original Filed Aug. 13, 1925 4 Sheets-Sheet 2

INVENTOR
Edouard M. Kratz
By Charles Hoffer
Attys

Nov. 4, 1930. E. M. KRATZ Re. 17,854
TRANSPARENT PAPER MACHINE
Original Filed Aug. 13, 1925 4 Sheets-Sheet 3
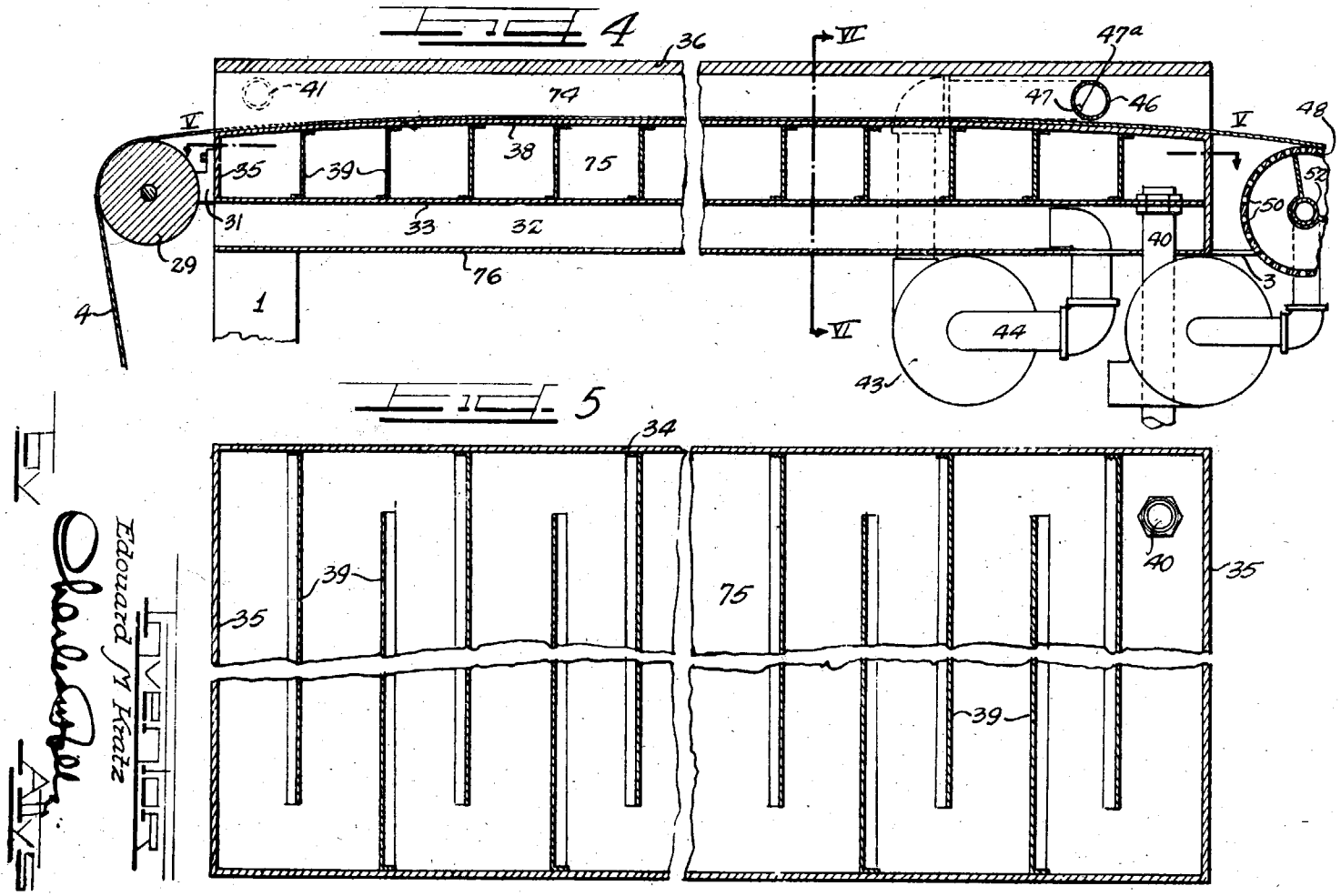
INVENTOR
Edouard M Kratz
BY Charles Wolle
Attys Nov. 4, 1930. E. M. KRATZ Re. 17,854
TRANSPARENT PAPER MACHINE
Original Filed Aug. 13, 1925 4 Sheets-Sheet 4
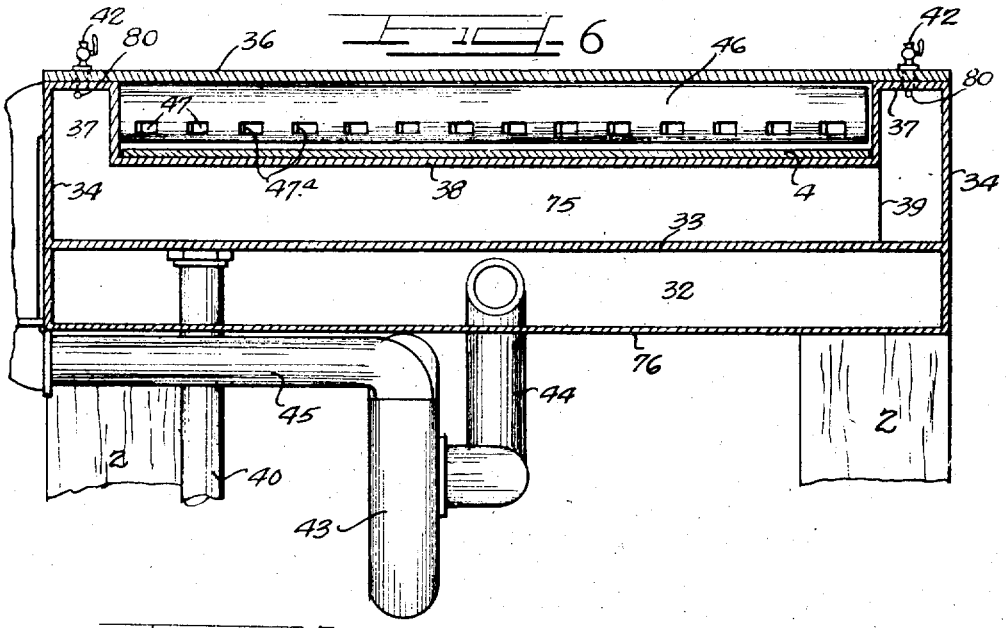
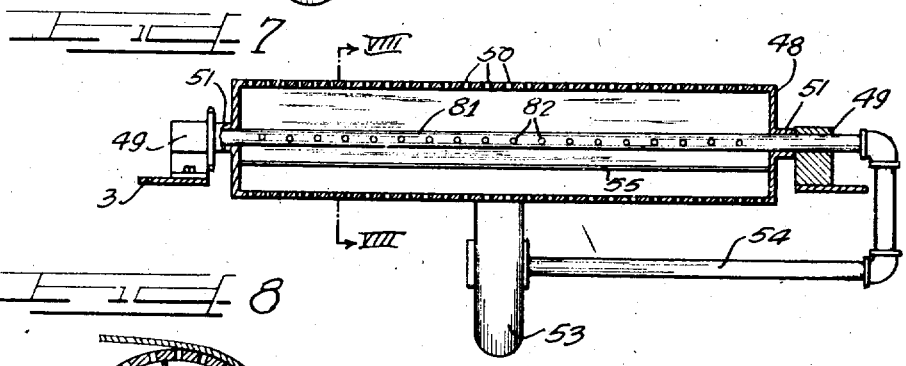
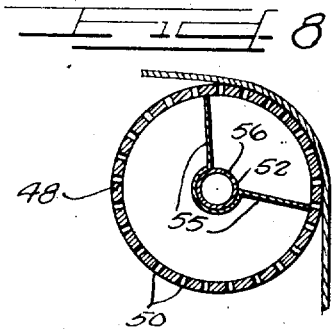
INVENTOR
Edouard M. Kratz
BY Charles Russell
ATTY Reissued Nov. 4, 1930

Re. 17,854

UNITED STATES PATENT OFFICE

EDOUARD M. KRATZ, OF CHICAGO, ILLINOIS, ASSIGNOR TO MARSENE PRODUCTS CO., OF CHICAGO, ILLINOIS, A CORPORATION OF ILLINOIS

TRANSPARENT-PAPER MACHINE

Original No. 1,650,585, dated November 22, 1927, Serial No. 49,970, filed August 13, 1925. Application for reissue filed April 29, 1929. Serial No. 359,140.

This invention relates to a machine for manufacturing sheet material, more particularly transparent paper, such as thin gelatine composition sheets for use in wrapping packages of candy and the like.

The machine includes improved feed mechanism, a novel jell box construction, a suction drive roll, and means for drying the sheet material. The sheet forming belt which I prefer to use in conjunction with this machine when making gelatine composition sheets forms the subject of a separate application, "a surface for forming transparent paper," Serial No. 11,335, filed February 24, 1925. The composition of the transparent paper and the process of making the paper is described in my application for "transparent paper and a process of manufacture," Serial No. 10,962, filed February 21, 1925.

It is an object of this invention to provide a simple, practical machine for the continuous manufacture of sheet material, more particularly transparent paper, said machine being especially adapted to making transparent gelatine composition sheets of great uniformity.

With the above and other objects in view as will be apparent, this invention consists in the construction, combination and arrangement of parts all as hereinafter more fully described, claimed and illustrated in the accompanying drawings.

Figure 1 is a diagrammatic view of a machine embodying my invention, partly in section and showing a feed mechanism, a jell box and a suction roll in elevation.

Figure 4 is an enlarged broken longitudinal section of the jell box, showing parts in elevation.

Figure 5 is a broken section taken substantially on line V—V of Figure 4, with parts removed.

Figure 6 is an enlarged section taken substantially on line VI—VI of Figure 4, with parts in elevation and broken.

Figure 7 is an enlarged longitudinal section of the suction roll, with parts in elevation.

Figure 8 is an enlarged section taken on line VIII—VIII of Figure 7 showing the operation.

Figure 3:
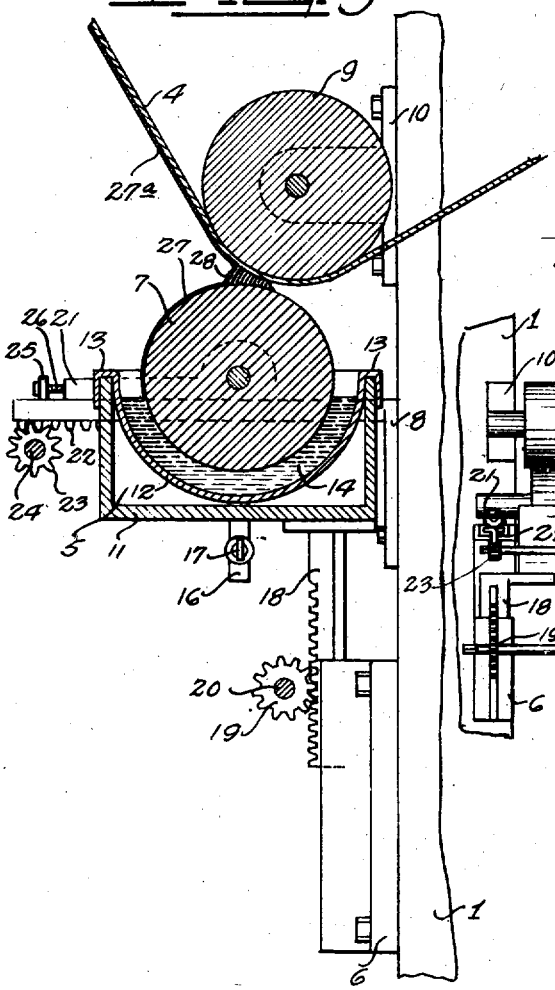
Figure 3 is an enlarged section taken on line III—III of Figure 2, showing the operation.

In referring to the drawings, especially to Figure 1, there is shown a machine embodying the principles of my invention in a preferred form as applied to the making of transparent paper from gelatine composition. It will, however, be understood that the machine is adapted to make sheet material from substances other than gelatine. The machine includes a supporting frame comprising vertical posts 1 and 2 and a platform 3 supported by said posts. A feed mechanism, for feeding a gelatine composition solution onto an endless sheet forming belt 4, is mounted on the posts 1. The belt 4 which I prefer to use is a fabric belting coated on one side with a special composition coating, described in the aforementioned application, "a surface for forming transparent paper," but it is obvious that any belt suitable for the purpose in view may be used. The feed mechanism includes a gelatine solution trough 5 adjustably supported on a pair of brackets 6 attached to the posts 1. A feed roll 7, adjustably supported by the brackets 8 on the posts 1, dips down into said trough 5, where it revolves partly immersed in the gelatine composition solution. An upper cooperating roll 9 is stationarily supported by the brackets 10 on the posts 1.

Figure 2:
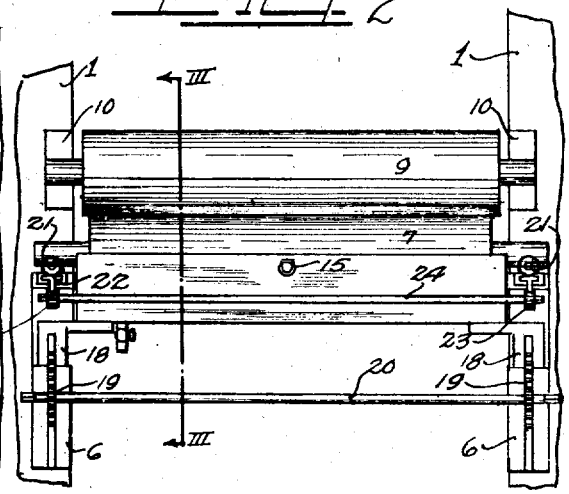
Figure 2 is an enlarged front elevational view of the feed mechanism with parts broken away.

As best shown in Figures 2 and 3, the trough 5 comprises a rectangular metal box 11 having a semi-cylindrical lining 12. Said lining 12 is made of sheet metal, soldered at its ends to the box ends, with its sides turned over the lateral edges of the box as at 13 to furnish additional support. The space between the lining 12 and box 11 serves as an air jacket to retain the heat of the gelatine composition solution. The gelatine solution 14 is fed into the trough 5 through a pipe 15 entering the front of the trough (Figure 2). The level of the solution in the box may be controlled by an automatic float or a valve at 15 (not shown). A drain 16 having a valve 17 is provided in the bottom of the trough for draining the solution or washing out the trough. The trough is supported on a pair of vertically adjustable ratchet arms 18 slidably mounted in the brackets 6. A pair of ratchet wheels 19 connected by a rod 20 engage with said ratchet arms 18 to raise or lower the trough. The ends of the rod 20 are adapted to be engaged by a crank for manually raising or lowering the trough. The feed roll 7 is journaled in a pair of bearings 21 slidably mounted on a pair of horizontally slidable ratchet arms 22, said arms being grooved in the brackets 8. A pair of ratchet wheels 23 rigidly connected by a rod 24 serve to slide said ratchet arm in and out. A finer, screw adjustment, comprising a pair of lugs 25 attached to said ratchet arms 22 and screws 26 threaded in said lugs 25 and rotatably secured at their respective ends in said bearings 21, permits the individual adjustment of each end of the roll 7 for alinement purposes. The upper roll 9 is journaled in the stationary bearings 10 bolted to the posts 1. It will be noted that the upper roll is longer than the feed roll and that the axis of the upper cooperating roll 9 is vertically offset from the axis of the fed roll 7, so that lateral movement of the roll 7 changes the relative distance between the surfaces of said rolls, for a purpose now to be explained. As the feed roll is revolved (by driving mechanism not shown) it picks up a film 27 of gelatine composition on its surface. In the operation the feed roll is moved close enough to the upper roll so that the endless belt 4 passing around said upper roll contacts the film of gelatine composition, some of which will adhere to the belt in a thin film 27ᵃ. As the belt travels in an opposite direction from the upper surface of the feed roll 7, the gelatine composition film tends to build up in front of the belt to form a fillet 28. The depth of this fillet, as well as the thickness of the film 27ᵃ on the belt, will depend largely upon the viscosity of the gelatine composition solution. But with a given viscosity it is still necessary to adjust the distance between the feed roll and the belt so as to deliver an excess quantity of solution to the belt. The belt should not come into actual contact with the feed roll itself, since the specially prepared surface of the belt would thereby be injured. To achieve a fine adjustment and an accurate alinement between the roll and the belt is the object of the fine screw adjusting device. The reason for having the upper roll longer than the feed roll is to leave an uncoated margin on each edge of the belt, thereby preventing the solution from getting onto the back side of the belt. The belt in its travel is guided laterally so as to maintain a proper uncoated margin on both edges. If the gelatine film were applied to the entire width of the belt, difficulties would also arise from the curling of the belt during the drying operation.

As shown in Figure 1, the belt passes up from the feeding, or coating mechanism over a roll 29 through a jell box 30. Said jell box is supported by the platform 3. The construction of the jell box is best shown by reference to Figures 4 to 6 inclusive. The roll 29 is journaled in a pair of brackets 31 supported by bolts from the front end of the jell box. The jell box is made of sheet metal in the form of a relatively long, rectangular shallow box. This box is divided into three horizontal compartments, an upper air space 74 and a lower air space 32 both open at the front end, and an intermediate water-tight chamber 75, The box comprises a bottom 76, a cover or hood 36, intermediate horizontal walls forming the bottom wall 33 and top surface 38 of the chamber 75, and vertical side walls 34 and end walls 35 joining the horizontal walls 76, 33 and 36. The top surface 38, however, does not extend clear out to the side walls 34 but is secured to shoulders 37 extending the length of the box and opening into said chamber 75. This arrangement gives chamber 75 a U-shaped cross section. Said surface 38 is crowned longitudinally, as shown in Figure 4, for a purpose hereinafter set forth. A plurality of transverse baffle plates 39, each having a flanged end and flanged upper and lower edges, are attached at their ends to the sides 34 of the box, at their upper flanged edges to the under side of the surface 38 and at their lower flanged edges to the bottom wall 33. Said baffles are staggered, as is common in such construction. The attached ends of the baffle plates extend up into the hollow shoulders 37 to conform with the inner contours of said shoulders but do not form water-tight joints with said shoulders. The baffles serve to strengthen the jell box and especially to prevent the surface 38 from buckling.

The jell box serves to chill the liquid gelatine composition film on the belt 4 as it comes from the coating mechanism. For this purpose cold brine from a refrigerating plant is introduced through a pipe 40 in the bottom of the box into the chamber at the further end thereof. The brine circulates between the baffle plates 39 to the front end of the box where it passes out of the box through an elevated outlet 41 in one of the shoulders 37. In circulating, the brine carries with it a certain amount of entrapped air. This air must be relieved or else it will form air pockets under the surface 38, thereby preventing the proper exchange of heat through said surface. Vents 42 comprising a short nipple and stop cock are accordingly placed near the middle of the box in the top of the shoulders 37. Further, the baffles are perforated as at 80 to allow all of the air entrapped in the shoulders 37 to pass from either end of the box toward the center and there to be vented through the vents 80.

In the operation, the belt 4 carrying the liquid film passes over and in contact with the surface 38 of the jell box. The cold brine extracts the heat from the gelatine solution by conduction of the heat through the belt 4 and the crowned surface 38. The reason for crowning the surface 38 is now apparent, for if it were perfectly level the belt would tend to contact it tangentially at only two points, the front and the rear, with the result that the rate of conduction of the heat would be materially reduced. The efficiency of the heat transfer would also be reduced if air pockets were allowed to form under the surface. Furthermore, such pockets cause defrosted spots on the upper side of the surface 38 directly above the air pockets and ridges of ice accumulated where the condensed water vapor freezes beyond the defrosted spots. These ridges of ice raise the belt and cause unjelled streaks in the gelatine film. As a further cooling means, cold air is blown against the surface of the gelatine film as the belt passes through the jell box. An air fan 43, connected by piping 44 to the rear end of the space 32, draws the cold air out from this space and blows it through a system of piping 45 to a pipe 46 extending transverse of the jell box near the rear thereof and betwen the surface 38 and the hood 36. Said pipe 46 is provided with rectangular slots 47 having air deflecting fingers 47[a] on the inside of the pipe which direct the air currents against the film on the belt. By this arrangement the effective cooling value of both the upper and lower surfaces of the jell box is efficiently used.

The cooling of the gelatine composition solution in the jell box must be sufficient to bring the solution below its jelling or hardening temperature in order that the film may be perfectly set before it is dried. This is important as otherwise the film would flow on the belt and form ridges on its surface in the drying operation. The design of the jell box is such that the film may be quickly chilled, with the result that the machine may be run at high speeds.

From the jell box the belt 4 passes over a suction roll 48 journalled in bearings 49 bolted to the platform 3. As best shown in Figures 7 and 8, the suction roll 48 comprises a hollow cylindrical shell having perforations 50 through which the sucked air passes. The roll is driven by any suitable source of power (not shown). One of the journals 51 is hollow to admit a perforated pipe 81 extending the length of the roll and supported at the other end in the other journal. A suction fan 53, connected to said pipe by piping 54, furnishes the suction for the roll. Said roll is internally divided by longitudinal partitions 55 secured to the pipe 52 and extending radially outward to contact the revolving inner surface of the roll. The perforations 82 in the pipe 81 lie within the smaller sector bounded by said partitions. The suction action is thereby confined to the smaller arc of the surface of the roll intersected by said partitions. Said arc includes the surface normally in contact with the belt 4. The function of the roll is to draw the belt 4 through the machine. When power is applied to revolve the suction roll and the suction fan is started, the suction will draw the belt down against the surface of the suction roll and the frictional or suctional contact thus provided is sufficient to hold the belt from slipping. The belt is therefore pulled around as the roll revolves. But after the belt passes beyond the second partition 55 as it is no longer subject to the suction action, it leaves the roll and continues in its normal path. The suction roll thus serves to continuously pull the belt through the machine. An ordinary driven roll or a series of rolls in place of the suction roll would not afford the necessary frictional drag to pull the belt around, nor could a pair of rollers gripping the belt on both sides be used because of the gelatine film on the top side of the belt. A suction belt may be used in place of the suction roll in case it is found advisable.

From the suction roll the belt passes onto a system of traveling conveyers and is supported by them while it is festooned and dried. The mechanism conveying and festooning the belt includes a pair of spaced, short, inclined endless chains 56 travelling over lower sprocket wheels 57 and upper sprocket wheels 58, one of said rolls being driven. Said chains have coordinating spaced lugs, or brackets 59 which pick up tubes 60 one at a time from a box 61 holding said tubes. The arrangement whereby only one tube at a time is picked up by the brackets 59 is old and need not be explained. In passing upward the tubes pick up the belt from its under side and carry it along, the belt lying between the two chains and hanging in festoons over said tubes. After passing over the top of the sprocket wheels 58 the tubes slide over a pair of spaced arms 62 onto a horizontal conveyer 63, comprising a pair of spaced endless chains 56[a] similar in construction to the chains 56. Said chains 56[a] pass over and are driven by a pair of sprocket wheels 64. During the passage of the belt with attached film along the conveyer 63, heat is applied in the form of hot air to dry the film. The conveyer is housed in a long drying chamber or tunnel, represented in Figure 1 by the numeral 65. A box 66 collects the tubes 60 as they fall from the conveyer 63 at its farther end.

Supporting rolls 67 to 72 inclusive support and turn the belt in its return to the feeding mechanism.

At some point, as at roll 67, the dried film may be stripped mechanically from the belt and wound up on a shaft in a continuous sheet to form a roll 73. The belt may then be recoated and the process thus be made continuous.

It is thus seen that a simple, practical machine for the continuous manufacture of thin sheets of transparent paper from gelatine composition or other suitable sheet material has been provided. The novel adjustable feeding mechanism insures a sheet of uniform thickness, varying less than 1/10,000 of an inch across the width and length of the sheet. The use of a fabric belt gives a sheet of paper possessing much greater strength than sheets made on rigid, non-contractible surfaces. The jell box provides quick jelling or setting action so that the machine may be run at high speeds. The suction roll affords the necessary drive for the belt in a simple inexpensive way. The cooperating conveyers provide a simple method of carrying the belt along in compact form through the drying chamber.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. An apparatus for making sheets, said apparatus comprising a vertically adjustable trough for containing a solution of a material to form the sheet, a horizontally movable feed roll partly immersed in said solution, an upper roll in cooperation with said feed roll, a jell box, a driven suction roll, a drying tunnel, and an endless belt having a surface to which said sheet material will not stick when dry, said belt being adapted to be drawn by said suction roll between said cooperating rolls to pick up said solution to form a film on said surface, and over said jell box to harden said film.

2. In a sheet forming machine, a jell box having an upper and lower air space and a chamber therebetween, a cooling fluid in said chamber, a crowned upper surface to said chamber, a belt carrying a film of material to form the sheet in contact with said surface, and means for drawing cold air from said lower air space and blowing said cold air into said upper air space for chilling the film.

3. In an apparatus of the class described, a vertically adjustable trough for containing a solution of a material to form a sheet, a lower adjustable roll revolving partly immersed in said solution, an upper stationary roll cooperating with said lower roll but out of contact therewith, a jell box, a driven suction roll, means for applying suction to said roll, and endless sheet forming belt passing between said cooperating rolls in contact with said upper roll only, to pick up a film of said solution from said lower roll and passing over said jell box to chill said film, said belt being propelled by suction contact with said revolving suction roll, means for supporting said belt in festoon arrangement for drying said film, and mechanical means for stripping said film from said belt.

4. In an apparatus of the class described, a sheet machine comprising an endless sheet forming belt having a surface from which said sheet may be readily stripped when dry, a feed mechanism for coating said surface with a film of a material to form said sheet, a jell box for hardening said film, a drying tunnel for drying said film, and a suction roll for driving said endless belt.

5. In a machine of the class described, the combination with an endless belt having a surface adapted to the forming of sheet material thereon, of means for applying a film of said material to said belt, a jell box for cooling and setting said film on said belt, means for drying said film on said belt, means for stripping said film in sheet form from said belt, and a suction roll for driving said belt through said machine.

6. In a machine of the class described, the combination with a belt carrying a film of material to form a sheet, of a box containing a refrigerating fluid for chilling and hardening said film by contact of said belt with the upper surface of said box and means for drawing air cooled by contact with the under side of said box and blowing said cold air against said film for further chilling the same.

7. In an apparatus of the class described, the combination with an endless belt having a surface to which a gelatine composition film will not stick when dry, of means for applying a gelatine composition film to said belt, means for chilling said film to set the same, means for drying said film and festoon means on which said belt may travel during the drying process.

8. In a machine for making thin gelatine composition sheets including a traveling belt upon which the gelatine composition is adapted to be spread, a hollow chill box having a crowned upper surface for contact with said belt, the walls of said box defining a chamber for the circulation of a refrigerating fluid and means for effecting a circuitous flow of said fluid through said box.

9. In a machine of the class described, a chill device, comprising a hollow box having elevated side walls and a depressed crowned upper surface therebetween, a cover secured to the top of said side walls forming with said crowned surface an air chamber, an orificed pipe transversely positioned in one end of said chamber and means connected with said pipe for blowing air through said pipe orifices out over said crowned surface.

10. In a machine of the class described, a chill device, comprising a hollow box, the walls of said box defining a chamber for the circulation of a refrigerating fluid and air chambers above and below said fluid chamber and means for drawing air from the lower chamber and distributing said air in said upper chamber, said air being cooled by contact with the lower wall of said fluid chamber.

11. In a machine of the class described, a chill device, comprising a hollow box, the walls of said box defining a chamber for the circulation of a refrigerating fluid and air chambers above and below said fluid chamber, means for drawing air from the lower chamber and distributing said air in said upper chamber, said air being cooled by contact with the lower wall of said fluid chamber and means in said fluid and lower air chambers for effecting a circuitous flow of the fluid and air in the respective chambers.

12. In a machine of the class described including a traveling belt, carrying material to be congealed, a chill device, comprising a hollow member, the walls of said member defining a chamber for the circulation of a refrigerating fluid, a portion of the upper wall being depressed and longitudinally crowned for contacting said belt.

13. In a machine of the class described, a chill device, comprising a hollow member, the walls of said member defining a chamber for the circulation of a refrigerating fluid, a portion of the upper wall being depressed and longitudinally crowned, a cover extending over said crowned upper wall portion and spaced therefrom and means for distributing cooled air into the space so formed.

14. In a machine of the class described, a chill device, comprising a hollow member, the walls of said member defining a chamber for the circulation of a refrigerating fluid, a portion of the upper wall being depressed and longitudinally crowned, a cover extending over said crowned upper wall portion and spaced therefrom and means for distributing air drawn from beneath said chamber into the space so formed.

15. In an apparatus for forming sheets, a chill device comprising a box having a partition spaced from the bottom wall to form an air chamber therebetween, a depressed top wall forming with said partition a U-shaped brine chamber extending the length of the box, a cover for said depressed top wall forming therewith a second air chamber and means for circulating air from the bottom air chamber to and through the top air chamber.

16. A device as in claim 15 wherein the outermost top walls of the U-shaped chamber are provided with air outlets.

17. A device as in claim 15 wherein the U-shaped chamber is provided with a plurality of L-shaped baffles.

18. In a machine of the class described, a chill device comprising a hollow member, the walls of said member defining a chamber for the circulation of a refrigerating fluid, a portion of the upper wall being depressed and longitudinally crowned, a cover extending over said crowned upper wall portion and spaced therefrom, and means including a slotted pipe having deflecting fingers in the slots thereof for distributing air drawn from beneath said chamber into the space so formed.

In testimony whereof I have hereunto subscribed my name at Gary, Ind., county, Lake.

EDOUARD M. KRATZ.